United States Patent [19]
Hwang

[11] Patent Number: 5,208,582
[45] Date of Patent: May 4, 1993

[54] MULTIPLEXING INPUT DEVICE TO BE USED IN COMBINATION WITH AN INTEGRATED COMPUTER MOUSE CONTROL CIRCUIT

[75] Inventor: Jyn-Guo Hwang, Hsin-Chu, Taiwan
[73] Assignee: Hualon Microelectronics Corporation, Taiwan
[21] Appl. No.: 806,880
[22] Filed: Dec. 12, 1991
[51] Int. Cl.⁵ .................................................. G09G 3/02
[52] U.S. Cl. ...................................... 340/706; 340/709; 340/710
[58] Field of Search .............. 340/706, 707, 709, 710, 340/711; 74/471

[56] References Cited

U.S. PATENT DOCUMENTS 4,313,227 1/1982 Eder ................................. 340/709 X
4,891,632 1/1990 Chang ................................. 340/710
4,963,858 10/1990 Chien ................................. 340/710

FOREIGN PATENT DOCUMENTS 0178805 4/1986 European Pat. Off. ............ 340/710

Primary Examiner—Tommy P. Chin
Assistant Examiner—J. Chin
Attorney, Agent, or Firm—Ladas & Parry

[57] ABSTRACT

A multiplexing input device is to be used in combination with an integrated computer mouse control circuit and includes a movement sensor unit and a key input control unit. The movement sensor unit and the key input control unit are connected to four input terminals of a controllable variable impedance unit. A timing control circuit has a sensor activating output which intermittently operates the movement sensor unit. The timing control circuit controls the resistance of the variable impedance unit according to the input signal to be sampled. A comparator unit is connected to the output terminals of the variable impedance unit. The output signals of the comparator unit are received by a demultiplexing unit. The demultiplexing unit has a first set of data outputs corresponding to the movement signals from the movement sensor and a second set of data outputs corresponding to the status of press keys on the key input control unit. The timing control circuit controls the demultiplexing unit to update the first set of data outputs to correspond with the output signals from the comparator unit upon generation of a movement sampling signal and to update the second set of data outputs to correspond with the output signals from the comparator unit upon generation of a key input sampling signal.

1 Claim, 3 Drawing Sheets

MULTIPLEXING INPUT DEVICE TO BE USED IN COMBINATION WITH AN INTEGRATED COMPUTER MOUSE CONTROL CIRCUIT

BACKGROUND OF THE INVENTION

1. Field of the Invention

The invention relates to an integrated computer mouse control circuit, more particularly to a multiplexing input device to be used in combination with the integrated computer mouse control circuit.

2. Description of the Related Art

The computer mouse is a useful and handy tool for moving a cursor on a computer display screen. The computer mouse encodes the status of press keys provided thereon and the relative position and movement of the computer mouse on an X-Y plane. The computer mouse sends the resulting codes to a computer via a communications port. The computer then calculates the required displacement of the cursor and moves the cursor according to the calculated displacement. The computer also performs other operations in accordance with the received codes from the computer mouse.

Present integrated computer mouse control circuits have four pins connected to a movement sensor unit, three pins connected to input press keys, and several other pins connected to select switches and the like. Note that the size of the control circuit is relatively large because of the large number of inputs thereto, thus increasing the manufacturing cost thereof.

SUMMARY OF THE INVENTION

Therefore, the main objective of the present invention is to provide a multiplexing input device to be used in combination with an integrated computer mouse control circuit so as to reduce the required number of input pins of the latter.

Another objective of the present invention is to provide a multiplexing input device which can reduce the size and the manufacturing costs of the integrated computer mouse control circuit.

Accordingly, the preferred embodiment of a multiplexing input device of the present invention is to be used in combination with an integrated computer mouse control circuit and comprises:

a timing control circuit having a sensor activating output, a movement sampling signal simultaneous with the sensor activating output and a key input sampling signal;

a movement sensor unit activated by the sensor activating output of the timing control circuit, said movement sensor unit having four movement signals when activated;

a key input control unit including three press keys, a control switch and four resistor units connecting a respective one of the press keys and the control switch to an external voltage source;

a controllable variable impedance unit having a first input terminal receiving a first one of the movement signals and being connected to a first one of the press keys, a second input terminal receiving a second one of the movement signals and being connected to a second one of the press keys, a third input terminal receiving a third one of the movement signals and being connected to a third one of the press keys, and a fourth input terminal receiving a fourth one of the movement signals and being connected to the control switch; said controllable variable impedance unit being controlled by the timing control circuit so as to have a first impedance value when the sensor activating output is generated and a second impedance value much larger than the first impedance value when the key input sampling signal is generated; said controllable variable impedance unit further having four resistance output terminals;

a comparator unit including four comparator circuits, each of the comparator circuits having a first input terminal connected to a respective one of the resistance output terminals of the controllable variable impedance unit and a second input terminal connected to a reference voltage; said controllable variable impedance unit varying the input impedance to the comparator unit; said comparator unit having four output signals corresponding to the movement signals when the controllable variable impedance unit has the first impedance value; said output signals of the comparator unit corresponding to the status of the press keys and the control switch when the controllable variable impedance unit has the second impedance value; and a demultiplexing unit receiving the output signals from the comparator unit; said demultiplexing unit having a first set of data outputs corresponding to the movement signals and a second set of data outputs corresponding to the status of the press keys and the control switch; said demultiplexing unit updating the first set of data outputs to correspond with the output signals from the comparator unit upon reception of the movement sampling signal; said demultiplexing unit updating the second set of data outputs to correspond with the output signals from the comparator unit upon reception of the key input sampling signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
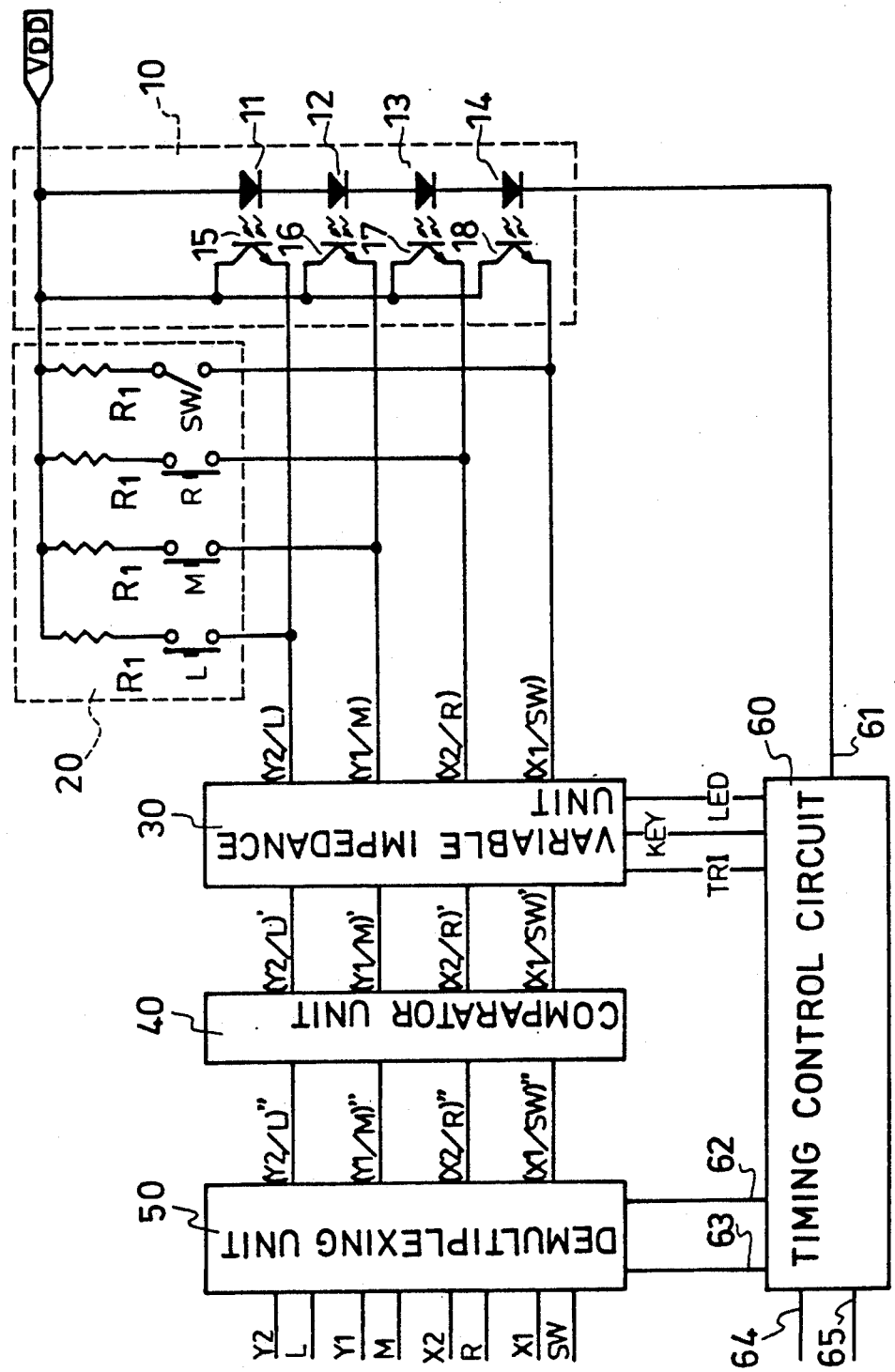
FIG. 1 is a schematic circuit block diagram of the preferred embodiment of a multiplexing input device according to the present invention.

Referring to FIG. 1, the preferred embodiment of a multiplexing input device according to the present invention is to be used in combination with an integrated computer mouse control circuit (not shown) and is shown to comprise a movement sensor unit (10), a key input unit (20), a controllable variable impedance unit (30), a comparator unit (40), a demultiplexing unit (50) and a timing control circuit (60).

The movement sensor unit (10) includes four light emitting diodes (11-14) and four phototransistors (15-18). The key input control unit (20) includes three press keys (L, M, R) and a control switch (SW). The press keys (L, M, R) and the control switch (SW) are respectively connected by four resistors (R1) to an external power source (VDD). The movement signal (Y2) detected by the phototransistor (15) and the status of the press key (L) are received by the controllable variable impedance unit (30) at a (Y2/L) input terminal thereof. The movement signal (Y1) detected by the phototransistor (16) and the status of the press key (M) are received by the controllable variable impedance unit (30) at a (Y1/M) input terminal thereof. The movement signal (X2) detected by the phototransistor (17) and the status of the press key (R) are received by the controllable variable impedance unit (30) at an (X2/R) input terminal thereof. The movement signal (X1) detected by the phototransistor (18) and the status of the control switch (SW) are received by the controllable variable impedance unit (30) at an (X1/SW) input terminal thereof.

The controllable variable impedance unit (30) has four resistance output terminals [(Y2/L)', (Y1/M)', (X2/R)', (X1/SW)'] connected to the comparator unit (40). The comparator unit (40) has four output signals [(Y2/L)", (Y1/M)", (X2/R)", (X1/SW)"] received by the demultiplexing unit (50). The demultiplexing unit (50) generates four movement signals (Y2, Y1, X2, X1) and four key input signals (L, M, R, SW) from the output signals [(Y2/L)", (Y1/M)", (X2/R)", (X1/SW)"] of the comparator unit (40).

The timing control circuit (60) has a sensor activating output (61) received by the movement sensor unit (10) so as to activate the light emitting diodes (11-14). The timing control circuit (60) further has three output pins (TRI, KEY, LED) connected to the controllable variable impedance unit (30) so as to vary the input impedance to the comparator unit (40). The timing control circuit (60) further has a movement sampling signal (62) and a key input sampling signal (63) received by the demultiplexing unit (50) so as to update the outputs thereof to correspond with the output signals from the comparator unit (40). The timing control circuit (60) further has an input terminal (64) which receives a 32,768 Hz clock input and an input terminal (65) which receives a frequency input that is equivalent to the desired operating frequency of the light emitting diodes (11-14).

Figure 2:
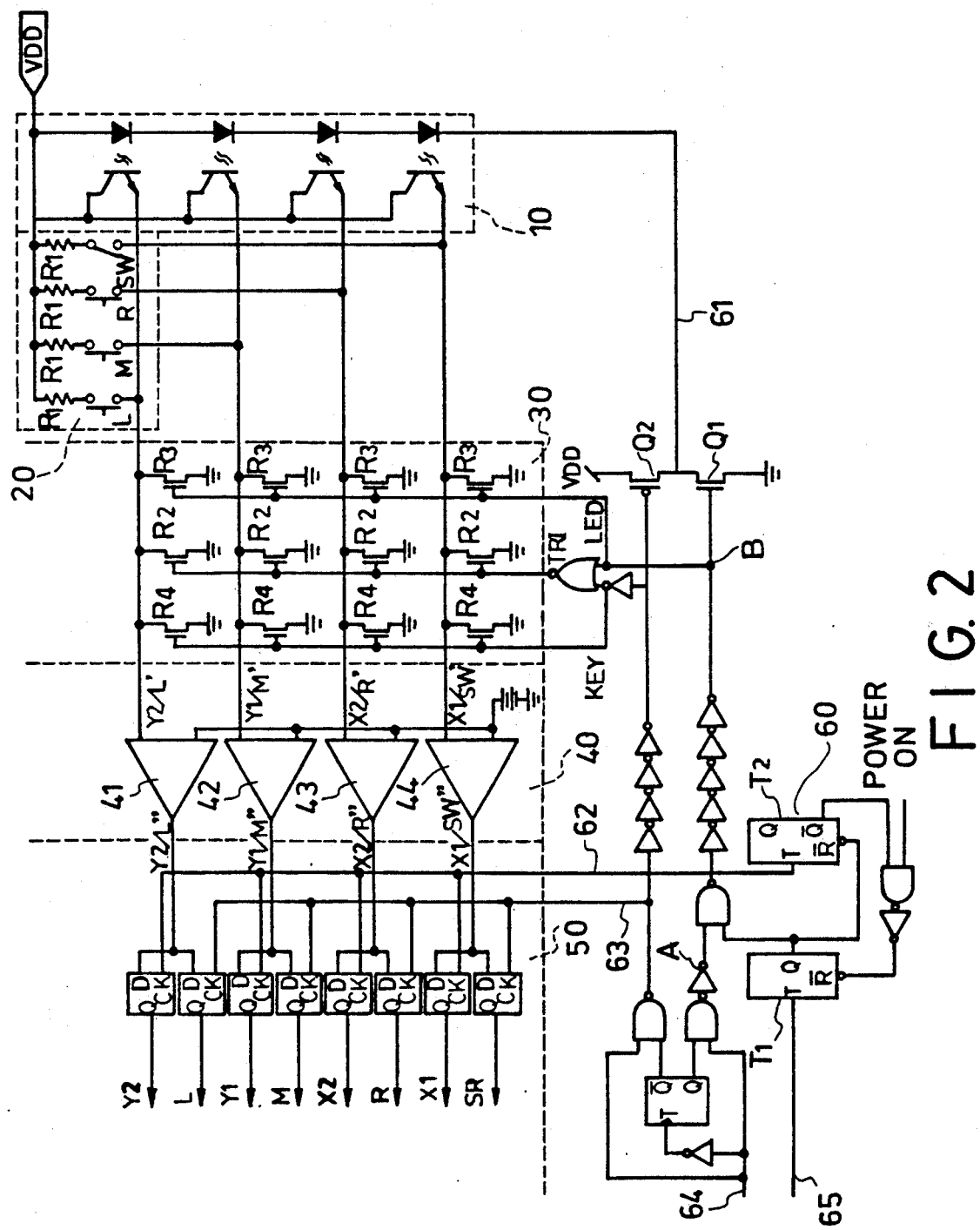
FIG. 2 is a schematic electrical circuit diagram of the preferred embodiment.

Referring to the schematic electrical circuit diagram shown in FIG. 2, the controllable variable impedance unit (30) comprises three sets of impedance units (R4, R2, R3). Each set of impedance units (R4, R2, R3) includes four field effect transistor (FET) units. Each of the FET units has a drain connected to one of the input terminals of the comparator unit (40), a source connected to ground, and a gate connected to one of the output pins (TRI, KEY, LED) of the timing control circuit (60). The pulse signal at the (TRI) pin is used to select the impedance unit (R2). The pulse signal at the (KEY) pin is used to select the impedance unit (R4). The pulse signal at the (LED) pin is used to select the impedance unit (R3). In the preferred embodiment, the impedance unit (R4) has a value of 200 kilohms, the impedance unit (R2) has a value of 50 ohms, while the impedance unit (R3) has a value of 15 kilohms.

Figure 3:
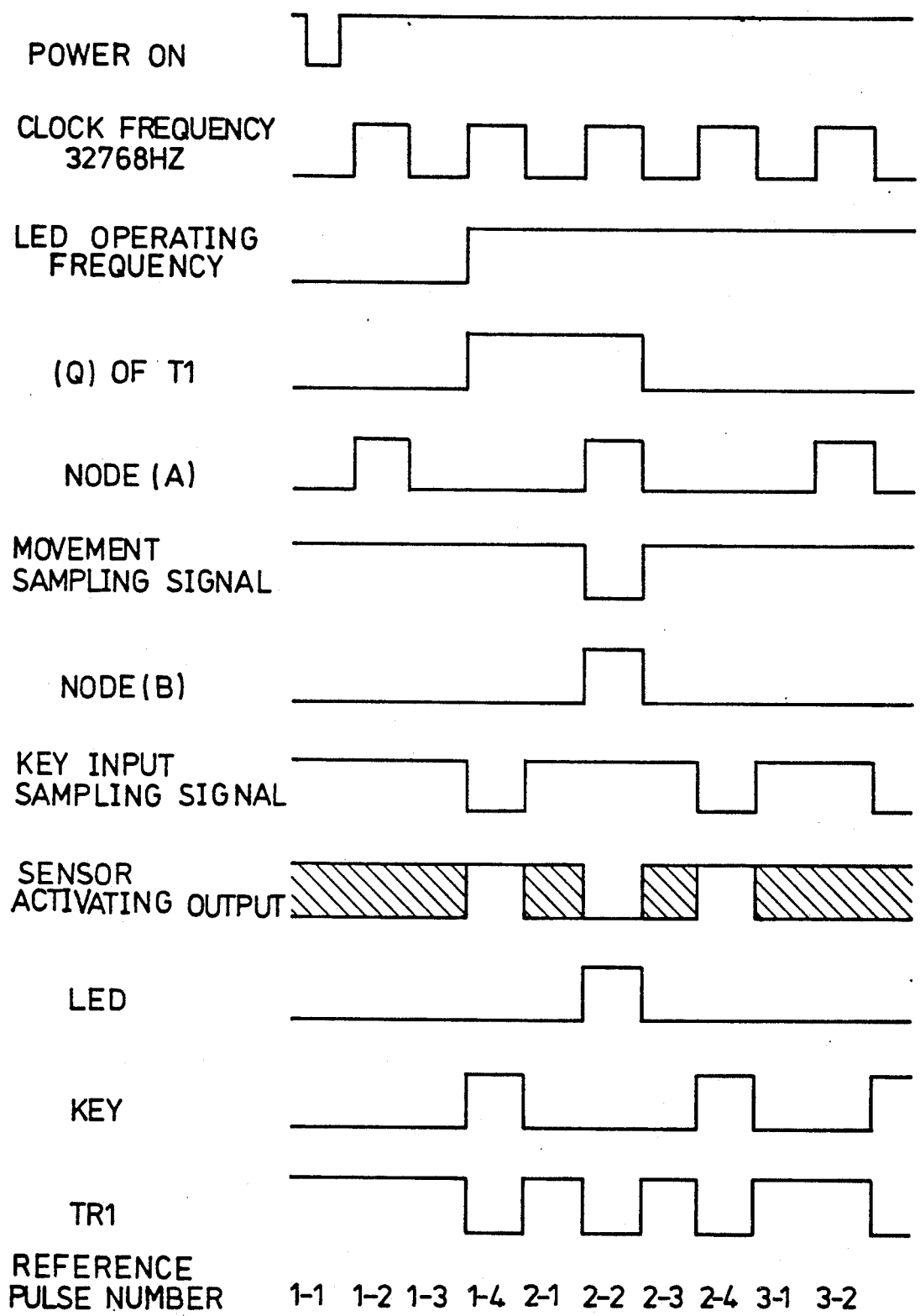
FIG. 3 is a timing diagram illustrating the operation of a timing control circuit of the preferred embodiment.

The comparator unit (40) includes four comparator circuits (41-44). Each of the comparator circuits (41-44) has a first input terminal receiving one of the resistance output terminals [(Y2/L)', (Y1/M)', (X2/R)', (X1/SW)'] of the controllable variable impedance unit (30) and a second input terminal connected to a reference voltage. FIG. 3 is a timing diagram which illustrates the operation of the timing control circuit (60). Referring to FIGS. 2 and 3, a POWER ON pulse signal is first provided to the timing control circuit (60) to reset a Flip-Flop (T1) of the same. The (Q) output of the Flip-Flop (T1) is connected to a second Flip-Flop (T2) and resets the latter. The timing control circuit (60) utilizes the 32,768 Hz clock input and the desired operating frequency of the light emitting diodes (11-14) so as to control the sampling action of the demultiplexing unit (50). The clock input is grouped into a series of four reference pulses. Each of the reference pulses has a period of approximately 15 microseconds. The sensor activating output (61) and the movement sampling signal (62) simultaneously occur and are used to activate the light emitting diodes (11-14) and to control the demultiplexing unit (50) to output the movement signals (Y2, Y1, X2, X1) from the comparator unit (40). The second and fourth one of the reference pulses are transition pulses. The data outputs of the demultiplexing unit (50) do not undergo any change at this stage. The key input sampling signal (63) is simultaneous with a third one of the reference pulses and is used to control the demultiplexing unit (50) to output the key input signals (L, M, R, SW) from the comparator unit (40).

During the period of the reference pulse 1-1, the clock input (64) is in a high logic state and the diode operating frequency input (65) is in a low logic state. Node (A) is in a high logic state and the (Q) output of the Flip-Flop (T1) is in a low logic state. The movement sampling signal (62) is in a high logic state, and node (B) is in a low logic state, thereby turning off a first FET transistor (Q1). The key input sampling signal (63) is in a high logic state to turn off a second FET transistor (Q2). The sensor activating output (61) is at a high impedance state at this stage. The logic states of the movement signals (Y2, Y1, X2, X1) and the key input signals (L, M, R, SW) at the outputs of the demultiplexing unit (50) remain unchanged.

During the period of the reference pulse 1-2, the clock input is in a low logic state, node (A) is in a low logic state. The (Q) output of the Flip-Flop (T1) is still in a low logic state. The movement sampling signal (62) is in a high logic state, node (B) is in a low logic state, and the first FET transistor (Q1) is in an OFF state. The key input sampling signal (63) is in a high logic state to maintain the second FET transistor (Q2) in the OFF state. The sensor activating output (61) is at a high impedance state at this stage. The logic states of the movement signals (Y2, Y1, X2, X1) and the key input signals (L, M, R, SW) at the outputs of the demultiplexing unit (50) remain unchanged. The (TRI) pin of the timing control circuit (60) is in a high logic state to cause the impedance unit (R2) (50 ohms) to conduct. The resistance of the impedance unit (R2 is very small relative to those of the impedance units (R3, R4) so as to ensure that the voltages at the input terminals of the comparator unit (40) are kept to a minimum.

During the period of the reference pulse 1-3, the clock input (64) and the diode operating frequency input (65) are in a low logic state. Node (A) is in a low logic state and the (Q) output of the Flip-Flop (T1) is in a high logic state. The movement sampling signal (62) is still in a high logic state, and node (B) is in a low logic state. The first FET transistor (Q1) is still turned off. The key input sampling signal (63) is in a low logic state to cause the second FET transistor (Q2) to conduct. The sensor activating output (61) is at a high logic state, and the light emitting diodes (11-14) of the movement sensor unit (10) are not yet in operation at this time. The (KEY) pin of the timing control circuit (60) is in a high logic state, thereby causing the impedance unit (R4) (200 kilohms) to conduct. The resistance of the resistors (R1) in series with the press keys (L, M, R) and the control switch (SW) are preferably equal to the impedance of the impedance unit (R4). Thus, a voltage signal equal to ½ VDD can be detected at the respective input terminal of the comparator unit (40) when one of the press keys (L, M, R) or the control switch (SW) is operated. The comparator unit (40) compares the ½ VDD voltage with a reference voltage (approximately 1 volt). The comparator unit (40) has four logic outputs which indicate the status of the press keys (L, M, R) and the control switch (SW). The output signals from the comparator unit (40) are received by the demultiplexing unit (50). The low logic state of the key input sampling signal (63) causes the demultiplexing unit (50) to output the key input signals (L, M, R, SW) from the comparator unit (61).

During the period of the reference pulse 1-4, the clock input is in a low logic state, node (A) is in a low logic state. The (Q) output of the Flip-Flop (T1) is in a high logic state. The movement sampling signal (62) is in a high logic state, node (B) is in a low logic state, and the first FET transistor (Q1) is in the OFF state. The key input sampling signal (63) is in a high logic state to turn off the second FET transistor (Q2). The sensor activating output (61) is at a high impedance state at this stage. The logic states of the movement signals (Y2, Y1, X2, X1) and the key input signals (L, M, R, SW) at the outputs of the demultiplexing unit (50) remain unchanged.

During the period of the reference pulse 2-1, the clock input (64) is in a high logic state and the diode operating frequency input (65) is in a high logic state. Node (A) is in a high logic state and the (Q) output of the Flip-Flop (T1) is in a high logic state. The movement sampling signal (62) is in a low logic state, and node (B) is in a high logic state, thereby turning on the first FET transistor (Q1). The key input sampling signal (63) is in a high logic state to turn off the second FET transistor (Q2). The sensor activating output (61) is at a low logic state to operate the light emitting diodes (11-14) of the movement sensor unit (10). The (LED) pin of the timing control circuit (60) is at a high logic state to cause the impedance unit (R3) (15 kilohms) to conduct [The resistance of the resistors (R1) is much greater than the impedance of the impedance unit (R3) so as to prevent electrical signals from the key input control unit (20) from interfering with the movement signals (Y2, Y1, X2, X1) generated by the movement sensor unit (10)]. The movement signals (Y2, Y1, X2, X1) detected by the phototransistors (15-18) of the movement sensor unit (10) are received at the input terminals of the comparator unit (40). The low logic state of the movement sampling signal (62) controls the demultiplexing unit (50) to output the movement signals (Y2, Y1, X2, X1) from the output terminals of the comparator unit (40).

Note that the Flip-Flop (T1) is reset at the tail edge of the reference pulse 2-1. Thus, the movement sampling signal (62) is at a high logic state and the sensor activating output (61) is at a high impedance state until the succeeding low logic state-to-high logic state transition of the diode operating frequency input (65).

It has thus been shown that the preferred embodiment of a multiplexing input device according to the present invention can reduce the required number of input pins of the integrated computer mouse control circuit. The size of the integrated computer mouse control circuit is reduced, thereby reducing the manufacturing cost thereof.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A multiplexing input device to be used in combination with an integrated computer mouse control circuit, comprising:

a timing control circuit having a sensor activating output, a movement sampling signal simultaneous with said sensor activating output and a key input sampling signal;

a movement sensor unit activated by said sensor activating output of said timing control circuit, said movement sensor unit having a first movement signal, a second movement signal, a third movement signal and a fourth movement signal when activated;

a key input control unit including a first press key, a second press key, a third press key, a control switch and four resistor units connecting a respective one of said first, said second and said third press keys and said control switch to an external voltage source;

a controllable variable impedance unit having a first input terminal receiving said first movement signal and being connected to said first press key, a second input terminal receiving said second movement signal and being connected to said second press key, a third input terminal receiving said third movement signal and being connected to said third press key, and a fourth input terminal receiving said fourth movement signal and being connected to said control switch; said controllable variable impedance unit being controlled by said timing control circuit to have a first impedance value when said sensor activating output is generated and a second impedance value much larger than said first impedance value when said key input sampling signal is generated; said controllable variable impedance unit further having four resistance output terminals;

a comparator unit including four comparator circuits, each of said comparator circuits having a first input terminal connected to a respective one of said resistance output terminals of said controllable variable impedance unit and a second input terminal connected to a reference voltage; said controllable variable impedance unit varying the input impedance to said comparator unit; said comparator unit having four output signals corresponding to said first, said second, said third and said fourth movement signals when said controllable variable impedance unit has said first impedance value; said output signals of said comparator unit corresponding to the status of said first, said second and said third press keys and said control switch when said controllable variable impedance unit has said second impedance value; and a demultiplexing unit receiving said output signals from said comparator unit; said demultiplexing unit having a first set of data outputs corresponding to said first, said second, said third and said fourth movement signals and a second set of data outputs corresponding to the status of said first, said second and said third press keys and said control switch; said demultiplexing unit updating said first set of data outputs to correspond with said output signals from said comparator unit upon reception of said movement sampling signal; and said demultiplexing unit updating said second set of data outputs to correspond with said output signals from said comparator unit upon reception of said key input sampling signal.

* * * * *